(No Model.)

M. E. FEENEY.
KETTLE LID CLAMP.

No. 508,005. Patented Nov. 7, 1893.

Witnesses:—
C. N. Caldwell.
H. S. Johnson.

Inventor:—
Mary E. Feeney,
per Paul Paurum
Attorneys.

THE NATIONAL LITHOGRAPHING COMPANY,
WASHINGTON, D. C.

UNITED STATES PATENT OFFICE.

MARY E. FEENEY, OF ST. PAUL, MINNESOTA.

KETTLE-LID CLAMP.

SPECIFICATION forming part of Letters Patent No. 508,005, dated November 7, 1893.

Application filed March 3, 1893. Serial No. 464,598. (No model.)

*To all whom it may concern:*

Be it known that I, MARY E. FEENEY, of St. Paul, Ramsey county, Minnesota, have invented certain Improvements in Kettle-Lid Clamps, of which the following is a specification.

My invention relates to improvements in devices adapted to be applied to the lids of kettles and similar cooking utensils, by means of which the lids of such utensils may be held in place while the liquid contents of the vessel are poured out. To this end my invention consists in providing a clamp which is adapted to fit upon the edge of the kettle and to be there secured by a set screw, and which is provided with a space or slot at the top to receive the edge of the lid and be therein held by means of another set screw.

My invention further consists in the specific construction hereinafter described and particularly pointed out in the claims.

Figure 1:
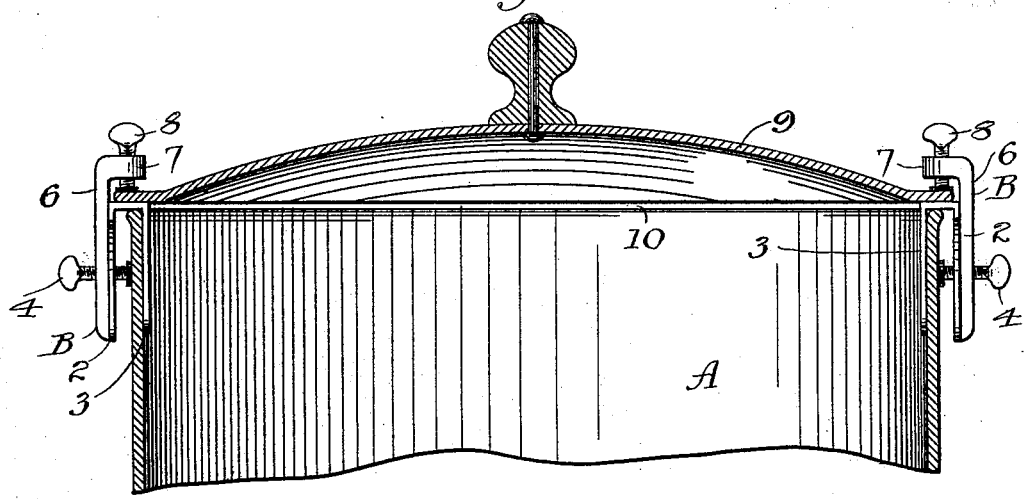
Figure 2:
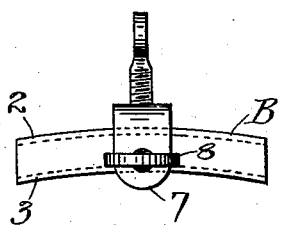
Figures 3, 4:
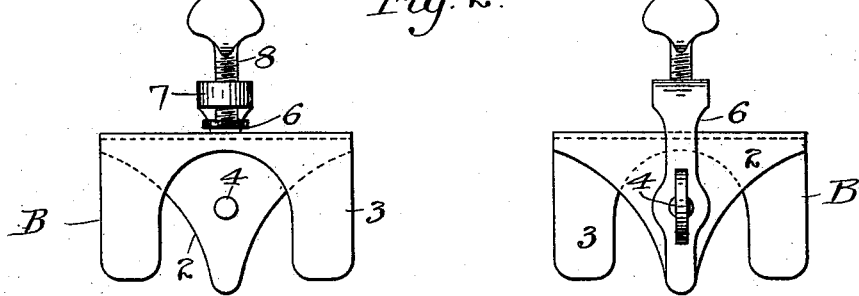

In the accompanying drawings forming part of this specification, Figure 1 is a partial vertical section of a kettle fitted with my improved attachment; and Figs. 2, 3 and 4 are details of the clamp.

In the drawings A represents the utensil, and B the clamp made up of the members 2 and 3 adapted to fit respectively on the outside and inside of the edge of the utensil.

4 is a set screw threaded into the outer member and adapted to bear against the outer surface of the vessel and to firmly secure the clamp in place thereon. Upon the clamp is fixed a standard 6 having an offset portion 7 threaded to receive the set screw 8. The space between the offset portion 7 and the top of the members 2 and 3 is of sufficient width to receive the kettle lid 9, which is therein secured by the set screw 8. A single clamp may be used to secure one edge of the lid leaving the other edge free to spring outward, or two may be used as shown in the drawings. The clamps thus support the lid a slight distance above the edge of the vessel leaving a vent 10 for the escape of steam and for the outlet of the liquid contents of the vessel when it is desired to empty the same.

I claim—

1. The combination with the kettle, of the clamp secured upon the edge thereof, and provided with a supplementary clamping device adapted to receive and hold the edge of the kettle lid, substantially as described.

2. A lid holder for cooking vessels, comprising a clamp secured to and resting upon the edge of the vessel, a shoulder upon which the lid rests, and a set screw carried by said holder and adapted to bear upon the upper surface of the lid and to clamp the same upon said shoulder.

3. In a device of the class described, comprising the clamp members 2 and 3, the set screw for securing the same to the vessel and the standard 6 carrying the set screw 8 adapted to engage and hold the edge of the lid, substantially as described.

In testimony whereof I have hereunto set my hand this 20th day of February, 1893.

MARY E. FEENEY.

In presence of—
M. L. COUNTRYMAN,
HARRY S. JOHNSON.